United States Patent [19]

Hay, II

[11] Patent Number: 4,759,262
[45] Date of Patent: Jul. 26, 1988

[54] APPARATUS FOR RESTRAINING ROTARY MOTION OF A MOTOR COMPONENT

[75] Inventor: Robert A. Hay, II, Midland, Mich.

[73] Assignee: The Dow Chemical Company, Midland, Mich.

[21] Appl. No.: 48,180

[22] Filed: May 11, 1987

[51] Int. Cl.$^4$ .................... F15B 15/22; F16M 13/00
[52] U.S. Cl. .................................... 92/8; 92/67; 92/68; 248/636; 248/49; 248/DIG. 1
[58] Field of Search .................. 92/67, 68, 8, 9, 28; 310/74, 51; 248/15, 26, 49, 636, DIG. 1; 60/39.31

[56] References Cited

U.S. PATENT DOCUMENTS

| | | | |
|---|---|---|---|
| 1,755,595 | 4/1930 | Craig | 92/68 |
| 2,891,514 | 6/1959 | Moeller | 92/9 |
| 3,158,208 | 11/1964 | Kammerer | 92/9 |
| 3,197,659 | 7/1965 | Marshall | 310/74 |
| 3,614,039 | 10/1971 | Norberg | 248/DIG. 1 |
| 3,907,220 | 9/1975 | Amelio | 60/39.31 |
| 4,050,660 | 9/1977 | Eggmann et al. | 248/DIG. 1 |
| 4,313,823 | 2/1982 | Locker | 310/51 |
| 4,405,283 | 9/1983 | Owsianny | 248/DIG. 1 |
| 4,442,754 | 4/1984 | Jazbera | 92/8 |
| 4,456,426 | 6/1984 | Bellati | 248/DIG. 1 |
| 4,500,054 | 2/1985 | Osborn | 60/39.31 |
| 4,513,953 | 6/1985 | Molders et al. | 248/DIG. 1 |

FOREIGN PATENT DOCUMENTS 2167522  5/1986  United Kingdom ................ 248/49

Primary Examiner—Robert E. Garrett
Assistant Examiner—Thomas Denion
Attorney, Agent, or Firm—V. Dean Clausen

[57] ABSTRACT

The invention is an apparatus that allows a motor to move in any one of three linear directions, but it restrains rotary motion of the motor housing. In practice, the motor is used for driving a pump or some other rotary motion device. The device includes a lever arm fastened to the motor housing and a hydraulic cylinder pivotally connected to each end of the arm and to a support member. Each cylinder is divided into two chambers by a piston head, and hydraulic lines connect the chambers of one cylinder to the chambers of the other cylinder. When the pump (or other rotary motion device) tends to cause rotational movement of the motor housing, and lever arm, each cylinder responds to this rotational load by trying to displace fluid (oil) from one cylinder to the other. Since each cylinder tries to displace an equivalent volume of oil toward the other cylinder, through a common conduit, displacement of the oil is not possible. This action restrains rotational motion of the motor housing and lever arm, but allows them to move in any one of three linear directions.

4 Claims, 7 Drawing Sheets

APPARATUS FOR RESTRAINING ROTARY MOTION OF A MOTOR COMPONENT

BACKGROUND OF THE INVENTION

In many industrial plants, particularly chemical plants, the process equipment includes pumps, mixers, or other rotary motion devices that are connected into a large vessel, such as a reactor, or an evaporator. Power for driving the pump, or other rotary motion device, is usually provided by a hydraulic or electric motor. The motor is usually fastened to a solid base, so that the motor housing won't rotate in response to the rotary motion of the pump. It is also common practice to bring the motor shaft and pump shaft into proper alignment at ambient temperatures.

During a process run, however, the large vessel may be subject to much higher or lower temperatures, so that it expands or contracts. When the vessel expands, which is sometimes referred to as "thermal growth", it will move in all three directions, that is, in both horizontal directions, and in a vertical direction. In the case of a vessel having its major dimension along one axis, e.g., the vertical axis, the movement will be mostly in a lengthwise direction, and to a lesser extent, in proportion, in both horizontal directions. Since it is conventional to fasten the motor to a base, or some other support, it can't move along with the vessel and pump as they expand. This places a considerable amount of shear stress and bending stress on the motor and pump shafts and on their bearings.

The present invention overcomes the problems described above. In one embodiment of the invention a lever arm is fastened at its center to the motor housing, instead of being secured to a solid base mounting. Hydraulic oylinders are pivotally connected to each end of the lever arm and to a support member. The piston and rod in each cylinder divide it into two chambers, front and rear. Hydraulic lines connect the chambers of one cylinder to the appropriate chambers of the other cylinder. When the pump, or other rotary motion device, tends to cause rotational movement of the motor housing and lever arm, both cylinders try to move in opposite directions. But, this movement is prevented because the piping that links the cylinders makes the fluid pressure resistance the same for each cylinder. Although the cylinders can't move in opposing directions, they can move in the same direction, at the same time. This capability allows linear displacement of the lever arm, but prevents rotational motion of the arm. The restraining action, therefore, allows the motor to "follow" movement of the vessel with a minimum amount of stress on the shafts and bearings.

SUMMARY OF THE INVENTION

This invention provides an apparatus that allows a motor to move in the linear direction, but it restrains rotary motion of a component of the motor. In one embodiment of the apparatus, the motor includes a rotatable shaft and a housing that encloses the shaft. The motor shaft, in turn, engages a rotary motion devioe, for example, a pump. A lever arm is fastened to the motor at the center point of the arm. One end of the lever arm is referred to as the right end, the other as the left end. Each end has a pivot means, and both pivots are an equal distance from the center point of the arm.

The apparatus includes left and right hydraulic cylinders, each cylinder having a piston head that divides the cylinder into a front chamber and a rear chamber. Each cylinder includes a piston rod that extends through the piston head and both chambers. Both cylinders are positioned adjacent to a common edge of the lever arm, the cylinders are in parallel relation to each other, both cylinders are filled with a hydraulic fluid and the piston head in both cylinders has an equivalent operating surface area. The apparatus also includes left and right support members, each having a pivot means. The piston rods of both hydraulic cylinders are fastened to the lever arm pivot means and the cylinder body is fastened to the respective support member pivots.

This apparatus also includes a hydraulic balancing system consisting of one fluid line that connects the front chamber of the left hydraulic cylinder to the rear chamber of the right hydraulic cylinder. Another line connects the front chamber of the right hydraulic cylinder to the rear chamber of the left hydraulic cylinder. In a typical operation of the apparatus, the rotary motion of the pump tends to cause the motor housing and lever to rotate in a direction opposite to that of the pump. In responding to this rotational load, each hydraulic cylinder tries to displace fluid (oil) from one cylinder to the other. Since each cylinder tries to displace an equivalent volume of oil toward the other cylinder, through a common conduit, displacement of the oil is not possible. The result of this action is to restrain rotational motion of the motor housing and lever arm.

DESCRIPTION OF THE INVENTION

Figure 1:
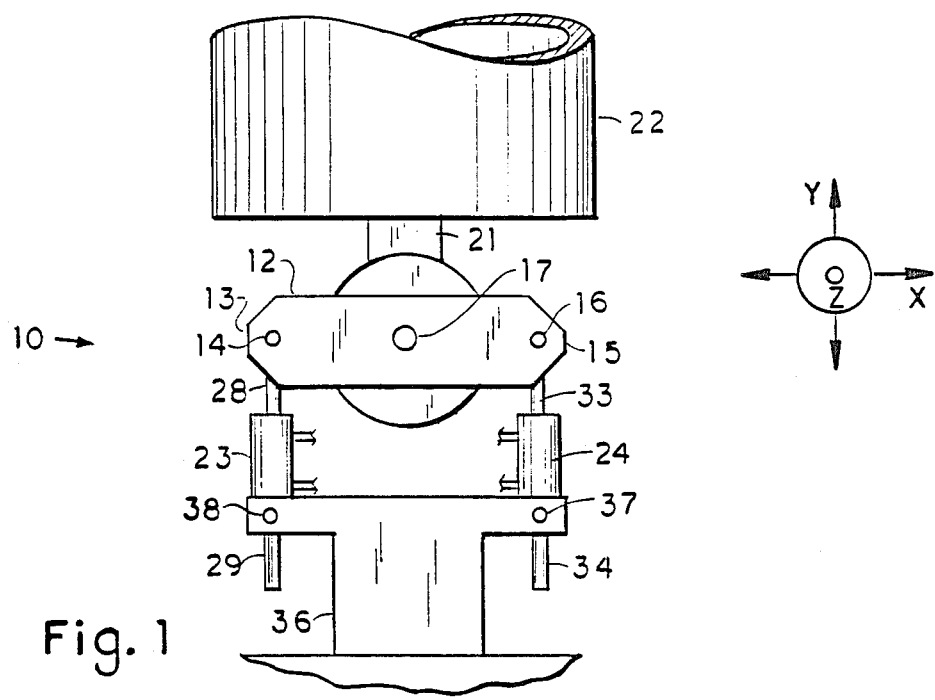
FIG. 1 is a front view, in schematic illustration, of one embodiment of the rotary motion restraining apparatus of this invention.
Figure 2:
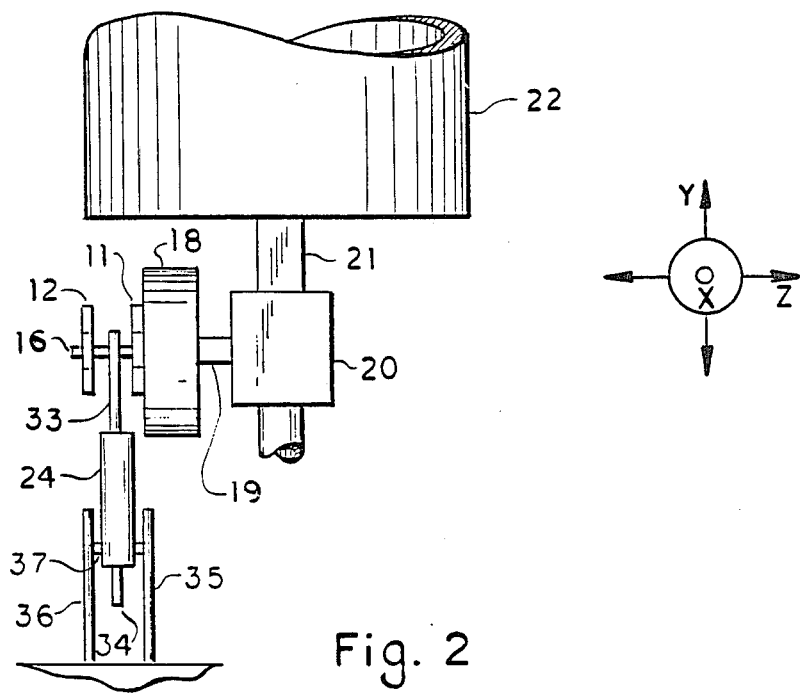
FIG. 2 is a side view, in schematic illustration, of the apparatus shown in FIG. 1.
Figure 3:
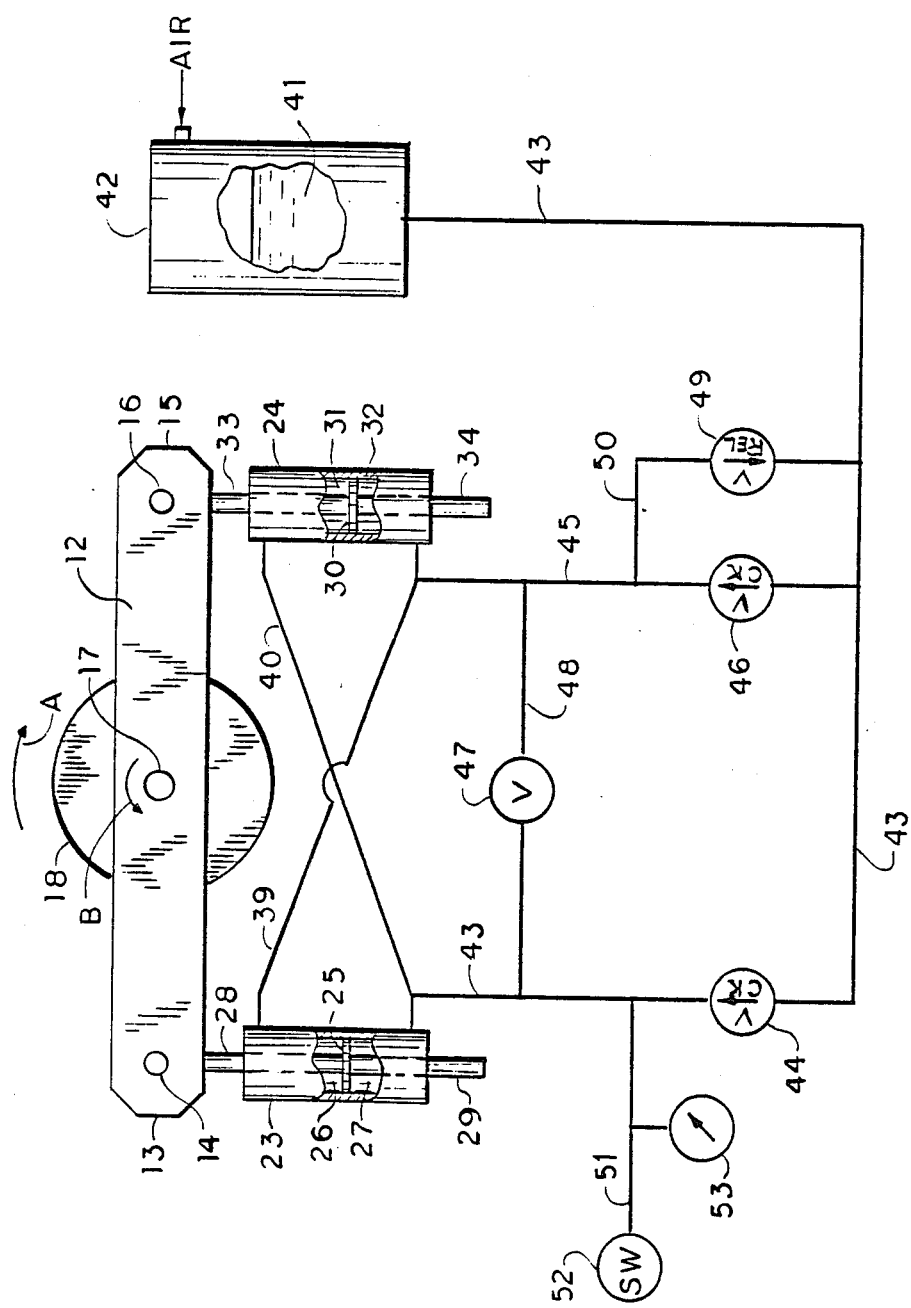
FIG. 3 is a schematic illustration of the restraining apparatus of FIGS. 1 and 2, which includes a hydraulic balancing system that is a part of this apparatus.

Referring to the drawings, particularly FIGS. 1, 2, and 3, the numeral 10 refers in general to the rotary motion restraining apparatus of this invention. The apparatus includes a lever arm defined by an inside member 11 and an outside member 12. The arm members are joined together at the left end 13 by a pivot shaft 14, and at the right end 15 by an identical pivot shaft 16. The inside arm member 11 is fastened at its center point 17 to a motor housing 18, so that the pivot shafts are an equal distance from the center point of the lever arm. The motor shaft 19 engages a rotary motion device, such as a pump 20, which is connected by a discharge conduit 21 into a process vessel 22.

The apparatus further includes a left hydraulic cylinder 23 and a right hydraulic cylinder 24. Referring particularly to FIG. 3, cylinder 23 includes a piston head 25 that divides the cylinder into a front chamber 26 and a rear chamber 27. A piston rod 28 extends through the piston head and is connected at one end to pivot shaft 14. The opposite end of rod 28 extends through the cylinder seal and defines a free end 29. In cylinder 24 is a piston head 30 that divides the cylinder into front chamber 31 and rear chamber 32. The piston rod 33 extends through head 30 and connects at one end into pivot shaft 16. The opposite end of rod 33 extends through the cylinder seal to define a free end 34.

Another component of this apparatus is a frame structure defined by an inside member 35 and an outside member 36, as best shown in FIG. 2. Members 35 and 36 are joined together by a pivot shaft 37, to provide a right support member for the right hydraulic cylinder 24, with the body of the cylinder being fastened to shaft 37. The opposite end of the frame structure provides a left support member for the left hydraulic cylinder 23, with the body of this cylinder being fastened to a pivot shaft 38, as indicated in FIG. 1.

Another component of the apparatus illustrated in FIGS. 1 and 2 is the hydraulic balancing system, which is illustrated schematically in FIG. 3. In this system a hydraulic line 39 connects the front chamber 26 of left hydraulic cylinder 23 to the rear chamber 32 of right hydraulic cylinder 24. A similar hydraulic line 40 connects the rear chamber 27 of cylinder 23 with the front chamber 31 of cylinder 24. Hydraulic fluid for this system, as indicated by numeral 41, is stored in tank 42 under a gas pressure, such as compressed air.

Hydraulic fluid from tank 42 is supplied to line 40 through line 43 and check valve 44. Fluid reaches line 39 through lines 43 and 45 and check valve 46. A manually-operated valve 47 is installed in line 48 that connects lines 43 and 45. A pressure relief valve 49 is installed in a branch line 50 that joins lines 45 and 43. Another branch line 51, from line 43, includes a pressure-actuated overload switch 52 and pressure gauge 53.

The practice of this invention can be illustrated by describing a typical operation of the apparatus illustrated in FIGS. 1-3. Referring to FIG. 3, when the motor is started, to drive pump 20, the rotary motion of the pump tends to cause the motor housing to rotate in the opposite direction. In FIG. 3, the arrow A indicates that the pump and motor shaft are rotating in a clockwise direction. The clockwise motion of the motor shaft causes a torque reaction in the motor housing 18 and the lever arms 11 and 12, in which the housing and arms tend to move in the opposite direction, that is, counter-clockwise, as indicated by arrow B.

When the lever arms try to rotate in a counterclockwise direction, it places a rotational load on both hydraulic cylinders 23 and 24. In response to this load, each cylinder tries to displace an equivalent volume of hydraulic fluid (oil) toward the other cylinder, through the fluid line 40, which is common to both cylinders. Since the fluid displacement can't take place, it acts as a restraint to prevent the motor housing and lever arms from rotating. Although the motor housing 18 is prevented from rotating, the motor shaft 19 is free to turn, so it can drive the pump 20.

At the start of a process run the hydraulic oil is charged to cylinders 23 and 24. This is done by applying a small amount of positive air pressure (above zero pressure) to the oil 41 in tank 42, to force the oil through check valves 44 and 46 into the cylinders. In the course of the run, the oil will expand slightly as it heats up, and it may exceed the desired pressure setting for the hydraulic system. To prevent damage to the system, the overpressure condition is relieved by pressure relief valve 49. The pressure setting on valve 49 is determined as the maximum differential pressure that will allow the low pressure side of the system to be as low as possible and still enable the cylinders to restrain superficial reverse maintenance torque reactions of the motor housing and lever arms.

During the run, if the low side pressure exceeds the setting on relief valve 49, the valve opens to allow the oil to backflow through the valve into tank 42. Switch 52 and pressure gauge 53 provide a means of monitoring the system pressure. The switch is part of an electrical control system (not shown) that operates the motor 20. If the system high side pressure rises above the limit setting of the switch, the switch senses the overpressure and stops the motor. Gauge 53 is a visual indicator that enables the operator to check the system pressure periodically. After the cylinders 23 and 24 have been in service for a while, some of the oil in each cylinder may start bypassing the piston heads 25 and 30. The resulting volumetric displacement of oil in each cylinder causes the lever arm members 11 and 12 to rotate out of their normal operating positions. When this happens, the bypass valve 47 can be opened to allow the oil in each cylinder to return to a state of equilibrium.

Figure 5:
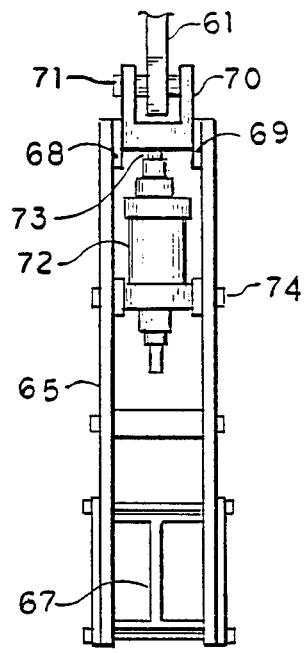
FIG. 5 is an end view of the mechanical structure illustrated in FIG. 4.
Figure 4:
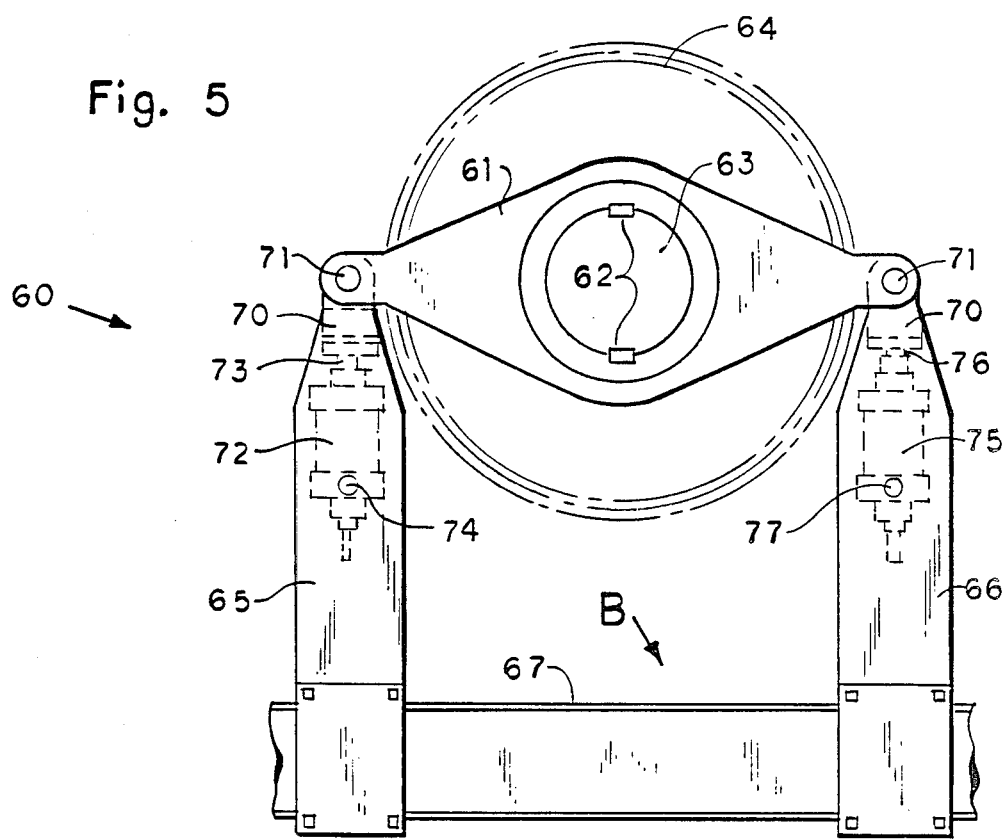
FIG. 4 is a front elevation view of another embodiment of a practical mechanical structure that includes principal components of the apparatus shown in FIGS. 1 and 2.

The mechanical structure shown in FIGS. 4 and 5 illustrates a practical arrangement for the rotary motion restraining apparatus of this invention. This apparatus, designated generally by the numeral 60, includes a lever arm 61, which is fastened by key members 62 to shaft 63 of a motor 64. A support base is generally designated by the letter B. The base B includes a two-piece frame member 65, and an identical two piece member 66. Both of the frame members straddle an I-beam 67 and are fastened to the beam.

Friction pads 68 and 69 are mounted on opposite inside surfaces of each frame member at the end remote from beam 67. Each frame member includes a yoke member 70, which is seated between and in sliding contact with each set of friction pads. Each yoke member 70 includes a pivot shaft, indicated by numeral 71, which is mounted crosswise in the yoke. The lever arm 61 is fastened at each end to one of the pivot shafts.

A hydraulic cylinder 72 is mounted in the frame member 65, with a piston rod 73 being fastened into yoke member 70. Below yoke 70 the cylinder body is fastened to the frame member by a pivot shaft 74. At the other end of the lever arm 61, is an identical hydraulic cylinder 75, having a piston rod 76 that fastens into the yoke 70. Below the yoke the cylinder body is fastened to the frame member 66 by pivot shaft 77.

Figure 6:
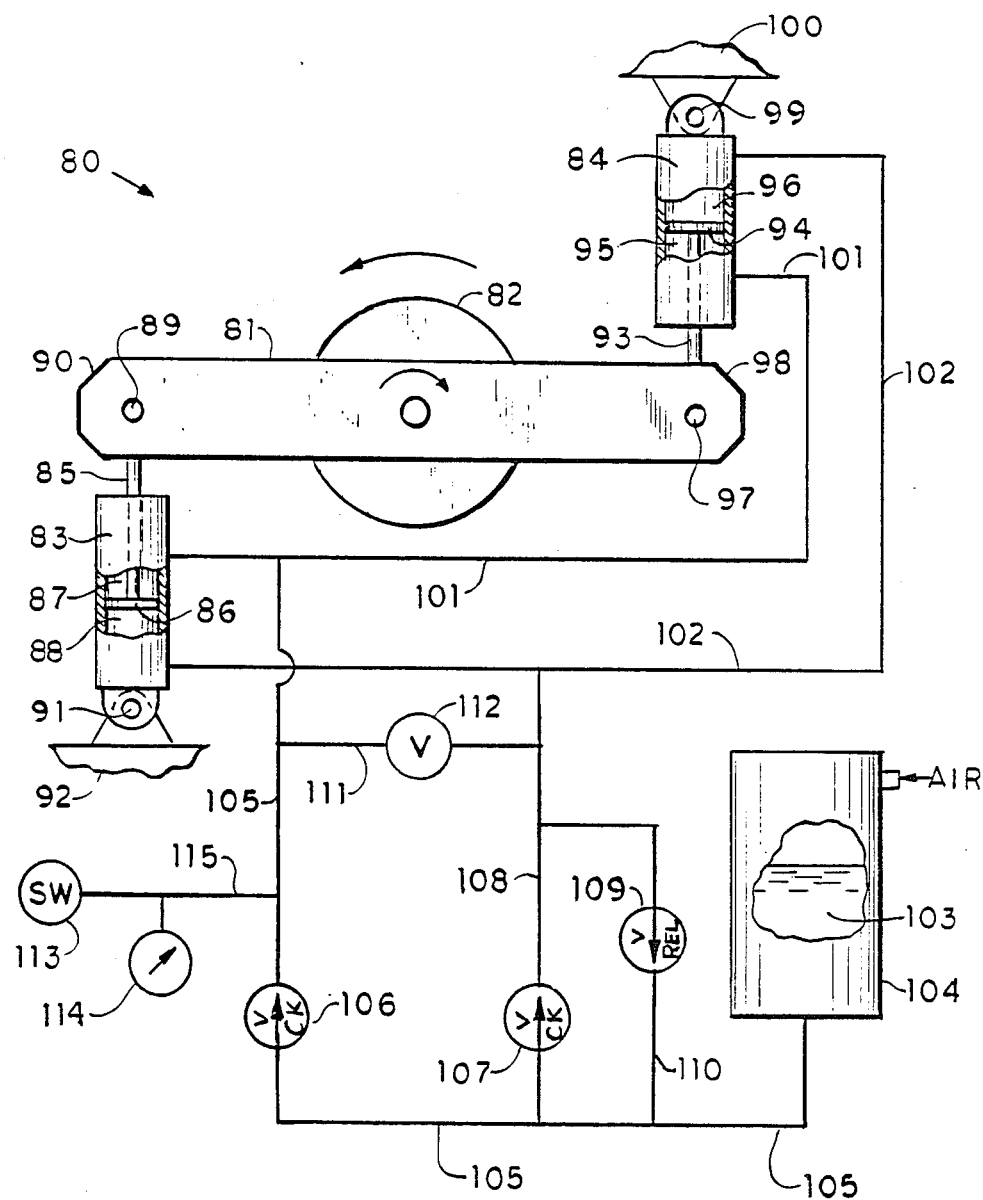
FIG. 6 is a schematic illustration of another embodiment of the restraining apparatus of this invention and this illustration includes the hydraulic balancing system of the apparatus.

The apparatus shown in FIG. 6 is a second embodiment of an apparatus for restraining rotary motion. This apparatus is designated generally by the numeral 80. In this apparatus a lever arm 81 is fastened at its center to a motor housing 82. The apparatus includes a left hydraulic cylinder 83 and a right hydraulic cylinder 84.

Cylinder 83 includes a piston rod 85 and piston head 86, which divides the cylinder into a front chamber 87 and a rear chamber 88.

The end of rod 85 opposite from head 86 is fastened to a pivot shaft 89 at the left end 90 of the lever arm. The end of cylinder 83 that is remote from arm 81 is fastened to a pivot shaft 91 mounted on a support member 92. The right hydraulic cylinder 84 has a piston rod 93 and piston head 94 that divides the cylinder into a front chamber 95 and rear chamber 96. At the end opposite from head 94 the rod is fastened to a pivot shaft 97, at the right end 98 of arm 81. At the end remote from arm 81, the cylinder 84 is fastened to a pivot shaft 99 mounted on a support member 100.

In the hydraulic balancing system for apparatus 80, the hydraulic line 101 connects front chamber 87 in cylinder 83 with front chamber 95 in cylinder 84. Another hydraulic line 102 connects rear chamber 88 in cylinder 83 with rear chamber 96 in cylinder 84. Hydraulic fluid 103 is stored in tank 104 under gas pressure, such as compressed air. The hydraulic fluid in tank 104 is supplied to line 101 through line 105 and check valve 106. Fluid reaches line 102 through lines 105 and check valve 107 in line 108. A bypass line 111 connects lines 105 and 108 and this line includes a manually-operated valve 112. This system also includes a pressure-actuated switch 113 and a pressure gauge 114, which are installed in branch line 115 that connects into line 105.

Referring to FIGS. 3 and 6, it will be noted that there are basic structural differences in each apparatus. For example, in the apparatus of FIG. 3, both hydraulic cylinders are positioned on the same side of the lever arm; in FIG. 6 the left hydraulic cylinder is positioned on one side of the lever arm and the right hydraulic cylinder on the other side of the arm. In FIG. 3 the hydraulic lines connect the front chamber of the left cylinder to the rear chamber of the right cylinder, and vice versa. In the apparatus of FIG. 6 the hydraulic lines directly connect the front chambers of each cylinder, and the rear chambers of each cylinder.

Both cylinders in the apparatus of FIG. 3 have a single piston head that divides the cylinder into front and rear chambers, and a piston rod that extends through the piston head. One end of the rod connects into a pivot shaft, and the opposite end extends through the cylinder seal to provide a free end. In the apparatus of FIG. 3, the piston rod must pass through both chambers in each cylinder, so that each chamber has the same volumetric displacement. The displacement must be the same because of the front to rear piping arrangement that connects both cylinders. In the apparatus of FIG. 6 the cylinder chambers are connected front to front and rear to rear, so that within a given cylinder the volume does not have to be the same for each chamber. In FIG. 6 both cylinders have a single piston head, but the piston rod is fastened to only one side of the head, rather than passing through the head.

In the apparatus of FIG. 6, the lever arm, the hydraulic cylinders, and the hydraulic balancing system operate in the same manner as the apparatus shown in FIG. 3, so that the motor housing is restrained from rotating, but the motor and lever arms are free to move in any one of three linear directions.

Figure 7:
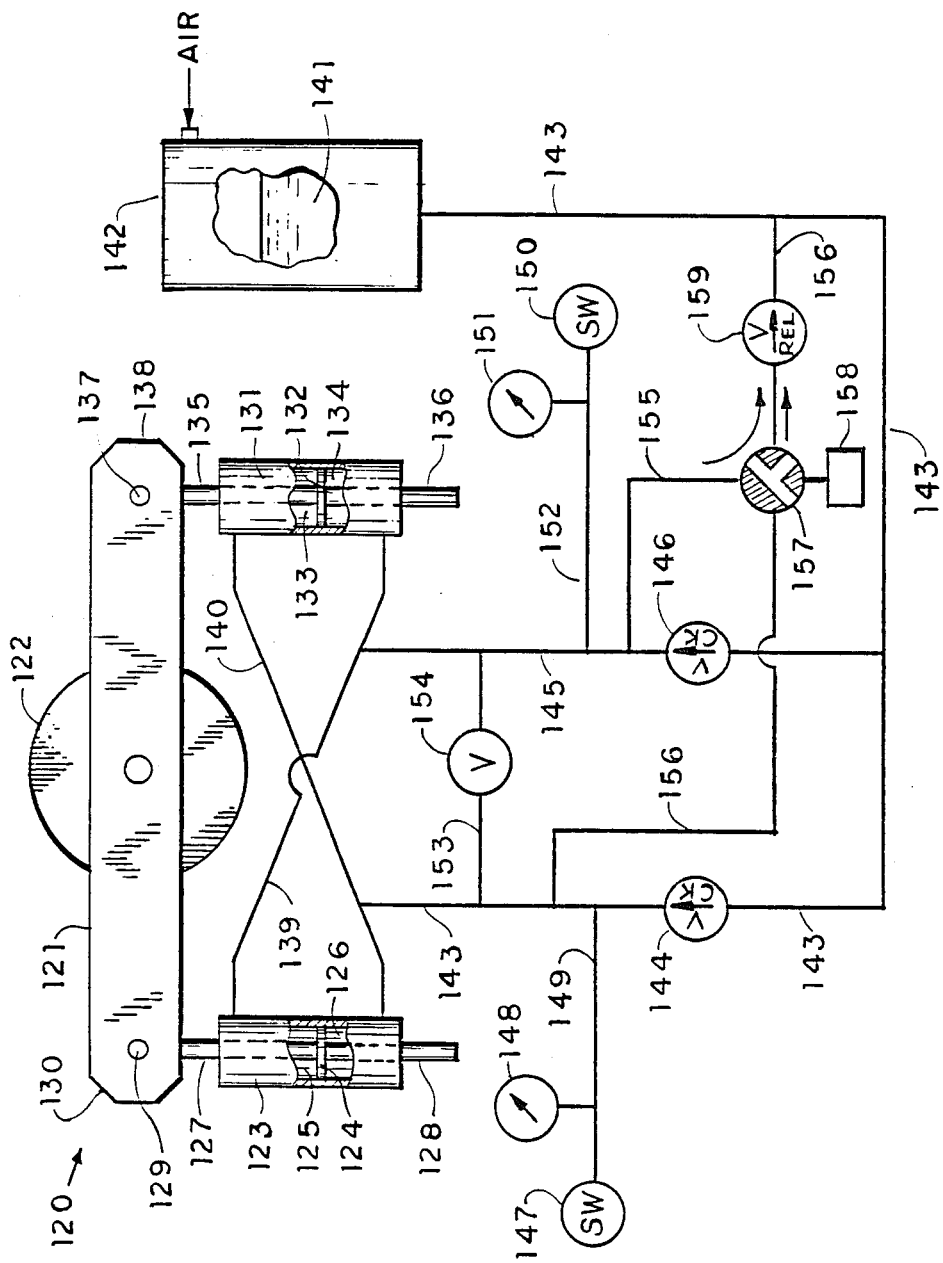
FIG. 7 is a schematic illustration of another embodiment of the restraining apparatus of this invention. This apparatus is similar to the embodiment illustrated in FIG. 3, except for the hydraulic balancing system.

FIG. 7 illustrates another embodiment of an apparatus capable of restraining rotary motion according to this invention. This apparatus, designated generally by numeral 120, includes a lever arm 121, which is fastened at its center to a motor housing 122. A left hydraulic cylinder 123 includes a piston head 124 that divides the cylinder into a front chamber 125 and rear chamber 126. A piston rod 127 extends through the piston head and is connected at one end into a pivot shaft 129 at the left end 130 of arm 121. The opposite end of the rod extends through the cylinder seal and defines a free end 128.

A right hydraulic cylinder 131 is divided by piston head 132 into front chamber 133 and rear chamber 134. The cylinder includes a piston rod 135 that extends through the piston head, and is fastened at one end into a pivot shaft 137 at the right end 138 of lever arm 121. The opposite end of rod 135 extends through the cylinder seal and defines a free end 136. The hydraulic balancing system of this apparatus includes hydraulic lines 139 and 140. Line 139 connects front chamber 125 in cylinder 123 to rear chamber 134 in cylinder 131. The rear chamber 126 in cylinder 123 is connected to the front chamber 133 in cylinder 131 by a line 140.

Hydraulic fluid 141 is stored in tank 142 under pressure. The hydraulic fluid in the tank is supplied to line 140 through a line 143, which includes a check valve 144. The fluid reaches line 139 through line 143 and line 145, which includes a check valve 146. A pressure-actuated switch 147 and pressure gauge 148 are installed in branch line 149 that connects into line 143. Another pressure-actuated switch 150 and pressure gauge 151 are installed in branch line 152, that connects into line 145. A bypass line 153 connects lines 143 and 145 and this line includes a manually-operated valve 154. A line 155 connects into line 145 at one end, and into a 3-way valve 157 at the other end. A line 156 connects line 157 into line 143 above check valve 144. On the other side of valve 157, line 156 connects into a pressure relief valve 159 and then into line 143 below tank 142. Valve 157 is operated by a solenoid unit 158.

In the apparatus of FIG. 7 the lever arm, the hydraulic cylinders, and the hydraulic balancing system operate in a manner similar to that of FIG. 3. But, in the embodiment illustrated in FIG. 3 high torques can be controlled only in one direction, which is clockwise. The apparatus illustrated in FIG. 7 is able to control torque in either direction by selecting the proper position of the 3-way valve 157, as operated by solenoid 158. The selection can be made automatically by interlocking the solenoid to a motor direction selection switch (not shown). If valve 157 is not properly selected, the situation is fail-safe anyway, because the torque levels are limited to much lower values by relief valve 159, instead of switch 150 or switch 147.

Figure 8:
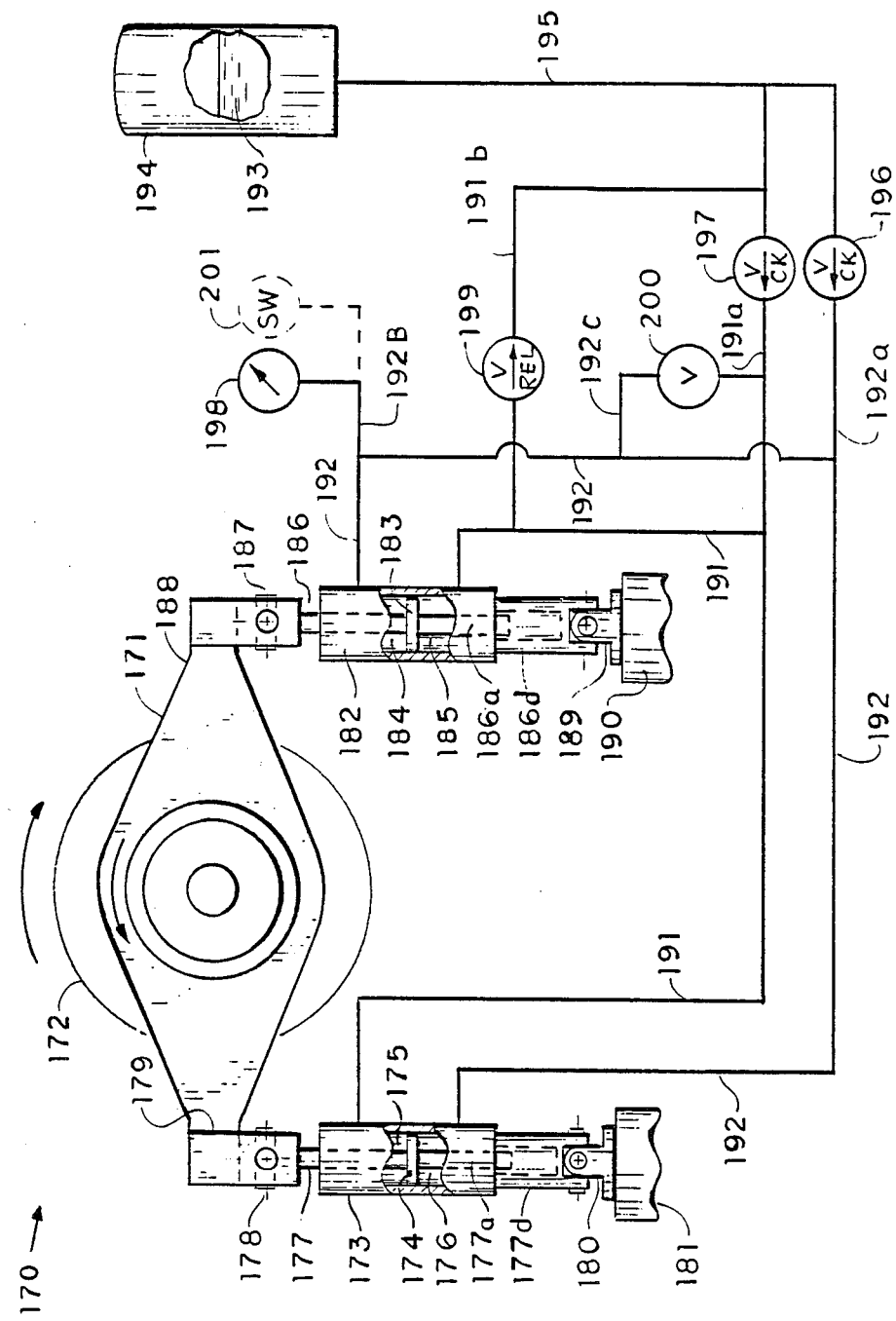
FIG. 8 is a schematic illustration of another embodiment of the restraining apparatus of this invention and this illustration includes a hydraulic balancing system.
Figure 9:
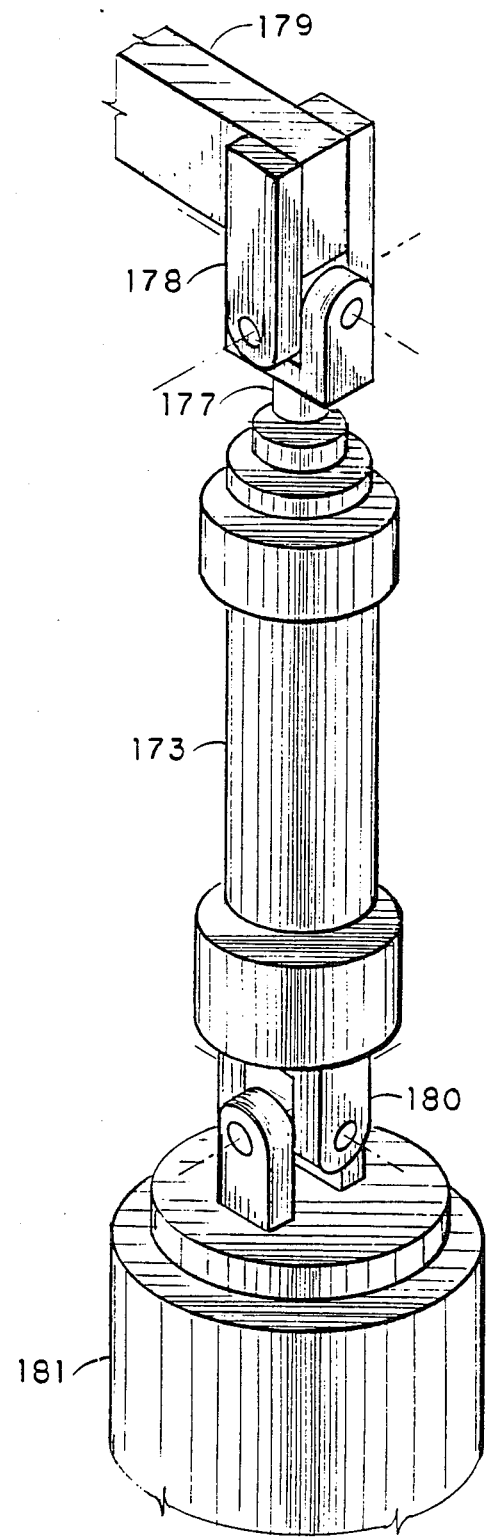
FIG. 9 is an enlarged view, in isometric illustration, of a hydraulic cylinder and pivot means arrangement, as used in the apparatus of FIG. 8.

FIGS. 8 and 9 illustrate another embodiment of the rotary motion restraining device of this invention. Referring particularly to FIG. 8, this apparatus is designated generally by numeral 170. The apparatus includes a lever arm 171, which is fastened at its center to a motor housing 172. A left hydraulic cylinder 173 includes a piston head 174 that divides the cylinder into front chamber 175 and rear chamber 176.

A piston rod 177 extends through the piston head 174. One end of this rod fastens into a universal joint 178, and the joint is fastened to the left end 179 of lever arm 171. The opposite end of rod 177 extends through the cylinder seal and defines a free end 177a that rides inside a cylinder shaft member 177b. The shaft member is fastened to another universal joint 180, which is secured to a support member 181. A right hydraulic cylinder 182 is divided by piston head 183 into front chamber 184 and rear chamber 185.

Piston rod 186 extends through piston head 183. One end of this rod fastens into a universal joint 187 which is, in turn, fastened into the right end 188 of lever arm 171. The opposite end of rod 186 extends through the cylinder seal and defines a free end 186a that rides inside a cylinder shaft member 186b. The shaft member is fastened to another universal joint 189, which is secured to a support member 190.

The universal joints used in this embodiment of the invention are conventional fittings referred to as Hooke's universal joints. FIG. 9 is an enlarged view of one of the hydraulic cylinders in this embodiment. For the purpose of this description the cylinder illustrated in FIG. 9 is represented as the left hand cylinder 173.

The hydraulic balancing system for this apparatus includes hydraulic lines 191 and 192. Line 191 connects the front chamber 175 of cylinder 173 into the rear chamber 185 of cylinder 182. The rear chamber 176 of cylinder 173 is connected by line 192 to the front chamber 184 of cylinder 182. Hydraulic fluid 193 is stored in tank 194 under pressure. From tank 194, the hydraulic fluid is supplied to the cylinders through hydraulic line 195 that connects into branch lines 191a and 192a. A check valve 196 is installed in line 192a and an identical check valve 197 is placed in line 191a. A pressure gauge 198 is installed in branch line 192b, that connects into hydraulic line 192. Lines 191 and 195 are connected by branch line 191b, which includes a pressure relief valve 199. Line 192 is connected into line 191a by branch line 191b, which includes a manually-operated valve 200. This system can also include a pressure switch 201 for monitoring the torque reaction of the motor. If the motor torque causes a high pressure condition, the switch will shut the motor down.

The lever arm, the hydraulic cylinders, and the hydraulic balancing system of the apparatus illustrated in FIGS. 8 and 9 operate in a manner similar to the embodiment shown in FIG. 3. In its normal operation, therefore, this apparatus restrains the motor housing and lever arm from rotating, but at the same time, these components are free to move in any one of three linear directions.

As mentioned earlier, each of the devices illustrated and described herein are capable of restraining any rotary motion of the motor housing and lever arm. But, at the same time, these components can move in any one of three linear directions, so that they can "move" with the process vessel as it expands from thermal strain. This feature of the invention can be illustrated by referring to the apparatus illustrated in FIGS. 1–3.

For example, if the process vessel 22 starts to expand in a lengthwise direction, the motor housing 18 and lever arms 11 and 12 will tend to move with the vessel. This movement is permitted by the travel of piston rods 28 and 33, which allow the arm members to move toward or away from the hydraulic cylinders 23 and 24 (see direction Y, FIG. 1). The piston rods can also slide back and forth on pivot shafts 14 and 16, to allow for horizontal movement of the motor housing and lever arms (see direction Z, FIG. 2). The motor housing and lever arms can also move in another horizontal direction, because the pivot shafts 14, 16, 37, and 38 allow the cylinders 23 and 24 to swing right or left on the frame members 35 and 36 (see direction X, FIG. 1).

The device shown in FIGS. 4 and 5, like the other devices illustrated herein, can move in any one of three linear directions. But this device has a particular feature that insures the linear movement that is desired. This feature is provided by friction pads 68 and 69, as shown in FIG. 5. These pads prevent the yoke members 70 and cylinders 72 and 75 from tilting within the frame members 65 and 66, so that the lever arm 61 can slide on the pivot shafts 71.

Another advantage of the apparatus illustrated in FIGS. 8 and 9 is that it can provide two (2) directions of linear displacement without sliding. The combinations of movements between universal joint sets 178 and 180, and joint sets 187 and 189, convert these secondary motions to pivotal-type motions.

The invention claimed is:

1. An apparatus that allows linear motion of a motor, but restrains rotary motion of a component of the motor, the apparatus comprises:
   a motor that includes a rotatable shaft and a housing that encloses the shaft:
   the rotatable motor shaft engages a rotary motion device;
   a lever arm that has a center point, a left end, a right end, a first edge, and a second edge, the lever arm is fastened to the motor housing at its center point, a lever arm pivot means is fastened to each end of the lever arm, and each lever arm pivot means is an equal distance from the center point of the lever arm;
   a left hydraulic cylinder including a single piston head that divides the cylinder into a front chamber and a rear chamber, and a piston rod that extends through the piston head and each chamber;
   a right hydraulic cylinder, the cylinder includes a piston head that divides the cylinder into a front chamber and a rear chamber, and a piston rod that extends through the piston head and each chamber;
   a left support member and a right support member, each support member includes a support member pivot means, and each pivot means is spaced from the second edge of the lever arm;
   the left hydraulic cylinder is fastened to the left support member pivot means, and one end of the piston rod in this cylinder is fastened to the left end lever arm pivot means:
   the right hydraulic cylinder is fastened to the right support member pivot means, and one end of the piston rod in this cylinder is fastened to the right end lever arm pivot means:
   the piston head in both hydraulic cylinders has an equivalent operating surface area, both cylinders are positioned adjacent to the second edge of the lever arm, both cylinders are parallel to each other, and both cylinders are filled with hydraulic fluid:
   a hydraulic balancing system, the system includes a first fluid line that connects the front chamber of the left hydraulic cylinder to the rear chamber of the right hydraulic cylinder, and a second fluid line that connects the front chamber of the right hydraulic cylinder to the rear chamber of the left hydraulic cylinder;
   wherein, in operation, the rotary motion device tends to cause the motor housing and lever arm to rotate in a direction opposite to the rotary motion of said device, and, in response to this rotational motion, the hydraulic cylinders attempt to displace equivalent volumes of hydraulic fluid at equal pressures in opposing directions, to thereby restrain rotational motion of the motor housing and lever arm.

2. The apparatus of claim 1 in which the lever arm is defined by an inside member and an outside member, the members are spaced apart, the members are fastened together at their left and right ends by a pivot shaft positioned crosswise between the members, the inside member is fastened to the motor, the piston rod of the left hydraulic cylinder is connected to the left end pivot shaft, and the piston rod of the right hydraulic cylinder is connected to the right end pivot shaft, such that the lever arm can move in a direction generally perpendicular to the plane in which the hydraulic cylinders and the lever arm are located.

3. The apparatus of claim 1 in which the left and right support members are each defined by a frame structure, the left and right hydraulic cylinders are fastened to a pivot means mounted in each frame structure, such that each cylinder is restrained from moving in a direction generally perpendicular to the plane in which the cylinders and lever arm are located.

4. An apparatus that allows linear displacement of a motor, but restrains rotary motion of a component of the motor, the apparatus comprises:
- a motor that includes a rotatable shaft and a housing that encloses the shaft;
- the rotatable motor shaft engages a rotary motion device;
- a lever arm that has a center point, a left end, a right end, a first edge, and a second edge, the lever arm is fastened to the motor housing at its center point, and a lever arm pivot means is fastened to each end of the lever arm, and each lever arm pivot means is an equal distance from the center point of the lever arm;
- a left hydraulic cylinder, the cylinder includes a piston head that divides the cylinder into a front chamber and a rear chamber, a single piston rod that is connected to a piston head and to the left lever arm pivot means;
- a right hydraulic cylinder, the cylinder includes a piston head that divides the cylinder into a front chamber and a rear chamber, and a piston rod that is connected to a piston head and to the right end lever arm pivot means;
- a left support member including a support member pivot means, the support member and pivot means are spaced from the second edge of the lever arm;
- a right support member including a support member pivot means, the support member and pivot means are spaced from the first edge of the lever arm;
- the left hydraulic cylinder is fastened to the left support member pivot means, the right hydraulic cylinder is fastened to the right support member pivot means, each cylinder is positioned at a right angle to the lever arm, each cylinder is filled with a hydraulic fluid, and the piston head in both hydraulic cylinders has an equivalent operating surface area;
- a hydraulic balancing system, the system includes a first fluid line that connects the front chamber of the left hydraulic cylinder to the front chamber of the right hydraulic cylinder, and a second fluid line that connects the rear chamber of the left hydraulic cylinder to the rear chamber of the right hydraulic cylinder:
- wherein, in operation, the rotary motion device tends to cause the motor housing and lever arm to rotate in a direction opposite to the rotary motion of said device, and, in response to this rotational motion, the hydraulic cylinders attempt to displace equivalent volumes of hydraulic fluid at equal pressures in opposing directions, to thereby restrain rotational motion of the motor housing and lever arm.

* * * * *